US007246066B2

(12) United States Patent
Black

(10) Patent No.: US 7,246,066 B2
(45) Date of Patent: Jul. 17, 2007

(54) SYSTEM AND METHOD FOR AUTOMATED COORDINATION AND COMMUNICATION OF SPORTING EVENT INFORMATION VIA THE WORLD WIDE WEB

(76) Inventor: John Black, 4860 W. Montara Cir., Las Vegas, NV (US) 89121

( * ) Notice: Subject to any disclaimer, the term of this patent is extended or adjusted under 35 U.S.C. 154(b) by 1068 days.

(21) Appl. No.: 09/827,357

(22) Filed: Apr. 5, 2001

(65) Prior Publication Data

US 2001/0034610 A1    Oct. 25, 2001

Related U.S. Application Data

(60) Provisional application No. 60/195,025, filed on Apr. 6, 2000.

(51) Int. Cl.
*G06F 3/00* (2006.01)
*G06F 17/60* (2006.01)

(52) U.S. Cl. ............... 705/1; 705/26; 705/27; 705/400; 705/500; 705/37; 345/331; 345/329; 707/6; 707/3; 709/203

(58) Field of Classification Search .................... None
See application file for complete search history.

(56) References Cited

U.S. PATENT DOCUMENTS 5,963,951 A * 10/1999 Collins ........................ 707/102
6,052,122 A *  4/2000 Sutcliffe et al. ............. 715/751
6,249,282 B1 *  6/2001 Sutcliffe et al. ............. 715/751

OTHER PUBLICATIONS www.angelfire.com/biz2/sjcboxing/match.html effective date of Mar. 4, 2000 on the "Wayback Machine" printed copies of web pages attached.*
http://web.archive.org/web/19991110011005/http://insideboxing.com (attached herein).*

* cited by examiner

*Primary Examiner*—John Weiss
*Assistant Examiner*—Matthew L. Brooks
(74) *Attorney, Agent, or Firm*—Kirton & McConkie; Michael F. Krieger

(57) ABSTRACT

The present invention relates to a system and method for coordinating a competitive sporting event. The present invention comprises receiving information from multiple users regarding the user's willingness to consider participation in a potential competitive sporting event. The present invention organizes the received information from the multiple users into an electronically searchable format. The invention also provides access to the organized information to the multiple users and, optionally, third parties.

8 Claims, 9 Drawing Sheets

SYSTEM AND METHOD FOR AUTOMATED COORDINATION AND COMMUNICATION OF SPORTING EVENT INFORMATION VIA THE WORLD WIDE WEB

RELATED APPLICATIONS

The present application is related to and claims priority to U.S. Provisional Application No. 60/195,025, filed Apr. 6, 2000, which is incorporated by reference for all purposes.

BACKGROUND

1. The Field of the Invention

The invention relates to electronic commerce. Specifically, the invention relates to a system and method of gathering and processing information and making the information available for organizing, coordinating, and promoting competitive sporting events on a wide area network such as the Internet, interactive networks, and other communication means.

2. Background

Coordinating, organizing, and promoting a competitive sporting event can be a difficult and complicated task. For example, coordinating a boxing match is a complicated endeavor. Before a boxing event can take place, the organizers must consider who the participants will be, what weight classes will be considered, and various skill levels and experience of available fighters. Moreover, trying to coordinate the numerous parties involved in putting on the boxing match (e.g., fighters, trainers, managers, promoters, sponsors, arenas, booking agents, matchmakers, and broadcasters) takes significant effort and time. To assure that the match will go according as planned, each individual entity must stay in contact with the other party. If one of the parties backs out of the agreement, the match may be cancelled.

Present methods of coordinating matches and informing relevant parties of the status of fight plans are inadequate and have several disadvantages. Currently a record book is used for matchmaking. The name of the record is *The Boxing Record Book* and is published annually by Fight Fax, Inc., however, using *The Boxing Record Book* to make matches and coordinate fights is very time consuming. *The Boxing Record Book* is large and unwieldy and does not allow for efficient matchmaking. Because of the difficulty in matchmaking using present resources, boxers may be limited in their matches to those options offered by a promoter. Another disadvantage to the present system is that in order to update *The Boxing Record Book*, an individual must request updated results for a boxer listed in the book from Fight Fax. Fight Fax will send a facsimile of an updated record to the requester for a fee. This is expensive and inefficient.

Good matchmaking is critical for the success of the fighter. The prior art's inability for boxer's managers and promoters to systematically find opponent options and purse information is a serious shortcoming of today's matchmaking system. Likewise, using prior art systems, boxers who are unable to find a promoter or who are not well known or who live outside an area where boxing matches are commonly held are at a serious disadvantage because the present system does not facilitate their participation. Another problem with the prior art is a lack of information regarding individual boxers available for fans, making it difficult for fans to follow and support a particular boxer.

The boxing industry lacks any form of centralized record keeping that is cost effective and easy to use. There is not a method of fair and easy access to data that is (or could be) kept. Matchmaking using the prior art systems is difficult and time consuming due to a lack of resources for coordinating a match. There is presently no method or system to aid boxers and managers in this decision making process, and due to a lack of information and ability to analyze the market value of a boxer, it is difficult for boxers to obtain the largest possible purse for their match. Fans have difficulty following the sport and purchasing related merchandise because there is a lack of information about fights and boxers.

SUMMARY AND OBJECTS OF THE INVENTION

The present invention relates to a system and method for coordinating a competitive sporting event. The present invention comprises receiving information from multiple users regarding the user's willingness to consider participation in a potential competitive sporting event. Multiple users may include, but are not limited to, contestants, managers, promoters, trainers, judges, officials, arenas, hotel-casinos, broadcast producers, sponsors, and any other sporting official or participant. The present invention organizes the information received from the multiple users into an electronically searchable format. The invention also provides access to the organized information to multiple users and, optionally, third parties. Procedures that could be used to access the information include, for example, utilization of a wide area computer network such as the World Wide Web. Additionally, any form of wireless communication or standard telecommunication could be used to receive and/or access information within the present invention.

In one embodiment of the present invention a software application is used to enable those involved in the boxing industry to coordinate and organize a boxing match through use of a Web site on a wide area network such as the Internet. The software application implements a system and method of receiving, collecting, storing, organizing and providing access to data. The users of the invention will be able to gain access to this information from the use of the Web site and will be able to receive notification regarding the information in the application.

An important benefit of the invention is that it allows boxers from all over the world to have access to boxing data which can be sorted and arranged in a number of useful ways. The invention provides an efficient solution to helping boxers choose and coordinate their boxing matches. Because the invention utilizes the World Wide Web a user can save time and money. Using the present invention, a boxer, or his manager, no longer has to make numerous phone calls to numerous people to arrange a boxing match, saving the individual a significant amount of time. The invention saves an individual money in other ways. First, it saves costs from expensive long distance telephone calls. Second, it gives a boxer access to a large number of mangers, trainers, and promoters, yielding an ability to find a manger, trainer, or promoter that could be cheaper than the one he is currently using. Third, it is possible that the invention will save money from expenses incurred through travel to different cities to arrange a boxing match. It is common in the boxing industry to require a manger fly to remote a city to meet with another boxer's manager, this practice incurs great costs. The invention encompasses the ability to minimize the amount of travel required by boxers, managers, and promoters. Finally, it reduces costs incurred from purchasing "*The Boxing Record Book*" and update faxes from Fight Fax, Inc.

As an aspect of one embodiment of the present invention the Web site provides a means whereby boxers can enroll online to find different services offered by the Web site. The Web site provides a method of fair and easy access to data that is stored within the system. The Web site provides information about any other boxer in the system. This means that each registered boxer will have his own personal Web page which is part of the main Web site. Each personal Web page may contain information such as statistics, biographical information, current manager, training schedules, fighting style, and video footage of a previous fight or training routine.

Another embodiment of the present invention comprises a system and method for giving fans easy access to boxing information. The boxer Web pages give fans an ability to access data about any boxer throughout the world. Fans can browse biographical or statistical information. Fans are also given the ability to easily find when the boxer is scheduled to fight and who his opponent is.

It is an additional embodiment of the invention to give boxing fans the ability to engage in electronic commerce and purchase boxing related merchandise. It is desired that fans can browse and purchase any sort of boxer specific sporting apparel. Such merchandise could include memorabilia, sporting equipment, paintings, boxing tickets, athletic equipment, books, nutrition products, streaming "real time" fight footage, and video of past fights. Merchandising of boxer's apparel is more effective if news content about his fights and retail sales are in one location. If a boxer has a great fight and his fan polling suddenly surges, a customized item online can be instantly offered on his page. If merchandise is advertised on a sports site, the chance of reaching fans of a particular boxer is low, but if it is on that boxer's page, the chance of them seeing his ad and clicking through to order is greatly increased. Likewise, if fans choose, they can purchase the ability to view and/or download videos of previous fights. This will provide royalties and income for the boxer in ways that are currently not available.

In a further embodiment of the present invention a system and method is used to provide the resources necessary to easily coordinate boxing matches. The invention reduces the time needed to coordinate a match, aids in combining boxers together who will produce a better fight, and coordinates all parties needed to put on a boxing match.

The invention provides a method for one boxer to challenge another boxer to a fight. After looking through statistics on various boxers, the boxer can login to a secure area of the Web site. The boxer can then challenge an opponent to a fight. While the boxer is logged in to the secure area of his personal page, a list is provided of any challengers who would like to fight him. The boxer can choose to accept any of these challenges or continue on and issue a challenge of his own. The challenge or acceptance will then be processed by the software and a notification will be sent to the boxer being challenged or accepted. The notification can take place in several ways. For example, one way in which notification can occur is for the invention to automatically send the opponent an e-mail. Another notification means could be a telephone call by an automated system to a cell phone or pager. A third form of notification could be a facsimile. The boxer receiving notification may be given the opportunity to accept or reject the challenge.

As part of the "challenge service," the invention will also support a function where the boxer can place limitations on his challenge. He may choose to fight his opponent only if the winning purse is a certain amount of money, or only on certain dates. Additionally, one of the boxers may desire a preferred promoter to promote the match and will not fight unless that promoter is used.

Using the present invention, matchmaking is also made easier because of the ability of promoters to access hundreds of pre-made boxing matches or potential matches. Promoters will have the ability to access a promoters Web page. This page will contain access to hundreds of available matches that can be easily sorted in a number of ways. For example, matches can be sorted by fighter, weight class, purse totals, fan polling and geographic location. This page will give a promoter the ability to quickly and easily evaluate a great variety of matches and determine which matches he would like to promote and which matches he can make the most profit on. The information on this page also yields the promoters an enhanced ability to promote more fights because the promoter does not have to spend as much time coordinating each match. Likewise, the ability for a promoter to find replacement fighters is enhanced, should there be a cancellation or illness.

The present invention may further provide Web pages and information for (and to) trainers, managers, hotel-casino properties, boxing television producers, booking agents, arenas and venues, sparring partners, and official boxing organizations such as the World Boxing Council (WBC), International Boxing Federation (IBF), and the World Boxing Association (WBA). The invention will store and coordinate information between the any and all of the mentioned boxing personnel. Each of these individuals will have access to the software and Web site. Each of these individuals may have a personal Web page on the system, similar to the boxer's personal Web page, to store information about their service and request and coordinate information about other entities within the system. It is foreseen that the invention can incorporate any and all individuals and services that are and ever will be related to the boxing industry.

The present invention helps to eliminate the monopolistic conditions within the industry. Utilizing the Internet, small promoters, new television companies, and smaller venues can compete more fairly with the megapromotion companies for fighters' contracts, TV dates, and fight promotion venues. The invention gives all of the participants greater access to members of the boxing community throughout the world.

It is also an object of some embodiments of the present invention to assist a boxer and/or manger in effective decision making. The software takes into account all of the various conditions and helps the boxers to negotiate the limitations placed upon fight restrictions. This becomes a great benefit when compared with traditional matchmaking methods. Because the boxer will have access to who wants to fight him and for how much money, he will be able to choose those fights which will earn the greatest amount of money and be most profitable. Likewise, it may be true that if the boxer fights in Las Vegas on a certain date he will make more money than if he fights in Atlantic City on the same date. The system is full of any and all information related to the boxing industry. The information in the system can be easily and quickly sorted and ranked according to relative importance. Therefore, the more information that can be provided to a boxer when making a choice, the greater the chance of the boxer making the best possible decision.

A further example of using information to aid in a decision process is provided to boxers through a promoter's personal Web page, which may contain information about the promoters. It can display information such as the current matches the promoters is sponsoring. It may also incorporate historical data such as success rates, purse sizes and the length of time the promoter has been in business, and television deals, etc.

In other embodiments of the invention the market value of boxers can be more successful analyzed, leading to bigger winnings for the boxer. As previously discussed a boxer will have personal Web pages. These Web pages can be viewed by fans and boxers alike. Fans can browse the boxers Web pages and read about their favorite boxers. As is common in many Web sites, the Web server will have capabilities to track which pages the fans look at through the use of "cookies." The data collected can be used to determine relevant fan information such as where the boxer has the greatest following. The collected data could be posted on the boxer's personal Web page. Thus, giving boxers and fans an idea about his popularity and location of his fans. Fan polling could also include fans voting for fights that they would like to watch or for boxers that they would like to see fight. A benefit of fan polling can help the boxer to determine what his market value may be in certain areas of the country.

Inasmuch as there is an increased amount of data available to the boxer, such as fan data, boxers can earn bigger net income from purses. With easy matchmaking and an increase in the number of fights available, boxers may consider reducing percentages paid to managers and eliminate the entire 10 percent fee paid to booking agents. Because every boxer will know the market value and asking prices for all fighters in his area, throughout the U.S., and the world, he will know whether he should ask more or less for an opportunity to fight an opponent. The more information a fighter has about the purse money available, the greater the opportunity to capitalize on that information and earn bigger purses.

Furthermore, embodiments of the invention could provide employment opportunities for trainers, strength coaches, conditioning coaches, and nutritionists. Boxers will be able to gain access to the availability of training staff and search out the personnel they need. This greatly enhances the ability of boxers to find qualified training staff and staff who will meet their specific boxing needs. It also enhances the ability of training staff to find employment opportunities. It is also desired that there will be links to all kinds of training material and equipment such as papers, periodicals and books all relating to strength, speed conditioning and nutrition. Such material could also be purchase through utilization of the electronic commerce features of the invention.

Boxers will also be able to find sparring partners through use of the present invention. The advantages are similar for sparring partners as with training staff. Sparring partners will be able to find employment opportunities with the boxers and the boxers or managers will easily be able to find sparring partners through utilization of the electronically searchable organization capabilities of the present invention.

These and other objects and features of the present invention will become more fully apparent from the following, description and appended claims, or may be learned by the practice of the invention as set forth hereinafter.

BRIEF DESCRIPTION OF THE DRAWINGS

These and other features and advantages of the invention will now be described with reference to the drawing of certain preferred embodiments, which are intended to illustrate and not to limit the invention, and in which.

DETAILED DESCRIPTION OF THE PREFERRED EMBODIMENTS

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

Embodiments of the present invention may be used in many different sporting industries. Relative to the boxing industry, the users of the present invention may include, without limitation, boxers, promoters, managers, trainers, fans, hotel-casino properties, boxing television producers and broadcasters, arenas, venues, matchmakers, booking agents, consumers, and many others who coordinate, arrange, and are involved in boxing matches. While embodiments of the present invention may be used in many applications, an application in the boxing industry is thought to be illustrative of many of these embodiments and is used herein as a non-limiting example of these embodiments.

Figure 1:
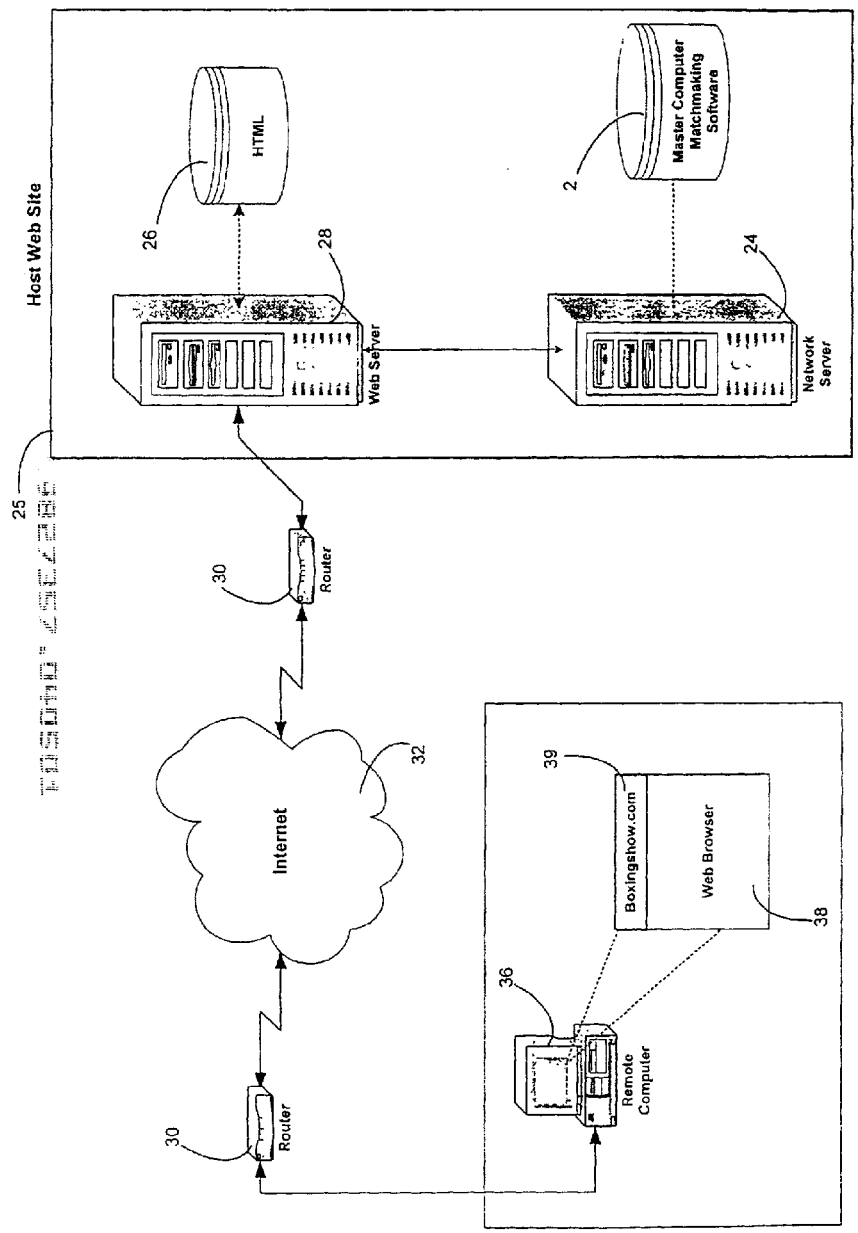
FIG. 1 is a high-level architectural drawing illustrating the primary components of a system that operates in accordance within the present invention.

In reference to FIG 1, one embodiment of the present invention comprises the general architecture of a matchmaking system. The system includes a remote computer 36, a Web site 25, all linked together via the Internet 32. Remote computer 36 may be any type of computing device that supports use of interactively browsing data via Web browser 38 that is capable of receiving and transmitting HTML 26. HTML 26 documents are the preferred method of providing a graphical user interface to access the systems and methods embodied in the present invention. Use of HTML 26 as a graphical user interface yields great flexibility to the invention because HTML 26 transmitted to Web browser 38 is easily changed and modified to provide the greatest benefit to the user. Remote computer 36 may be a personal computer running a Microsoft Windows 98 or NT operating system. Web browser 38 may be any commonly known browser software such as Microsoft Internet Explorer or Netscape Navigator used in decoding HTML 26. It is preferred that Web browser 38 include some form of encryption data transfer system to ensure confidentiality and prevent interception of communication and electronic commerce data as it is transferred across Internet 32.

Web site 25 is a site that provides various functionality for allowing those in the boxing industry to gather information, coordinate boxing matches, and permit individuals to purchase goods and services. It is preferred that Web site 25 could function in the manner described below, but could also be setup and function in any configuration that would allow the transmittal of data across a network to remote computer 36. Web site 25 will encompass Web server 28 capable of storing and accessing documents in HTML 26. Web server 28 may be connected to a network server 24. Network server 24 provides the primary means of running the master computer matchmaking software 2. Matchmaking software 2 will be described in greater detail below. Typically, Web site 25 will be operated and maintained by a business entity responsible for keeping the data updated, providing the goods and services purchased by individuals, and for handling customer service issues. In the example described herein, Web site 25 is the site of Boxingshow.com 39.

In operation, a user accesses Web site 25 using standard Web browser 38. A network protocol such as TCP/IP is sent from remote computer 36 to router 30 across Internet 32 to Web server 28. Web server requests information from matchmaking software 2 residing on network server 24. Matchmaking software 2 processes request from Web server 28 and transmits request to Web server 28. Web sever 28 converts the information to HTML 26 and sends a TCP/IP response to router 30 across Internet 32 to remote computer 36. Web browser 38 decodes HTML 26 message and displays the information in Web browser 38 to the user. Web site 25 can comprise any method which provides the function of embodiments of the present invention and considered within the scope of embodiments of the present invention.

Figure 2:
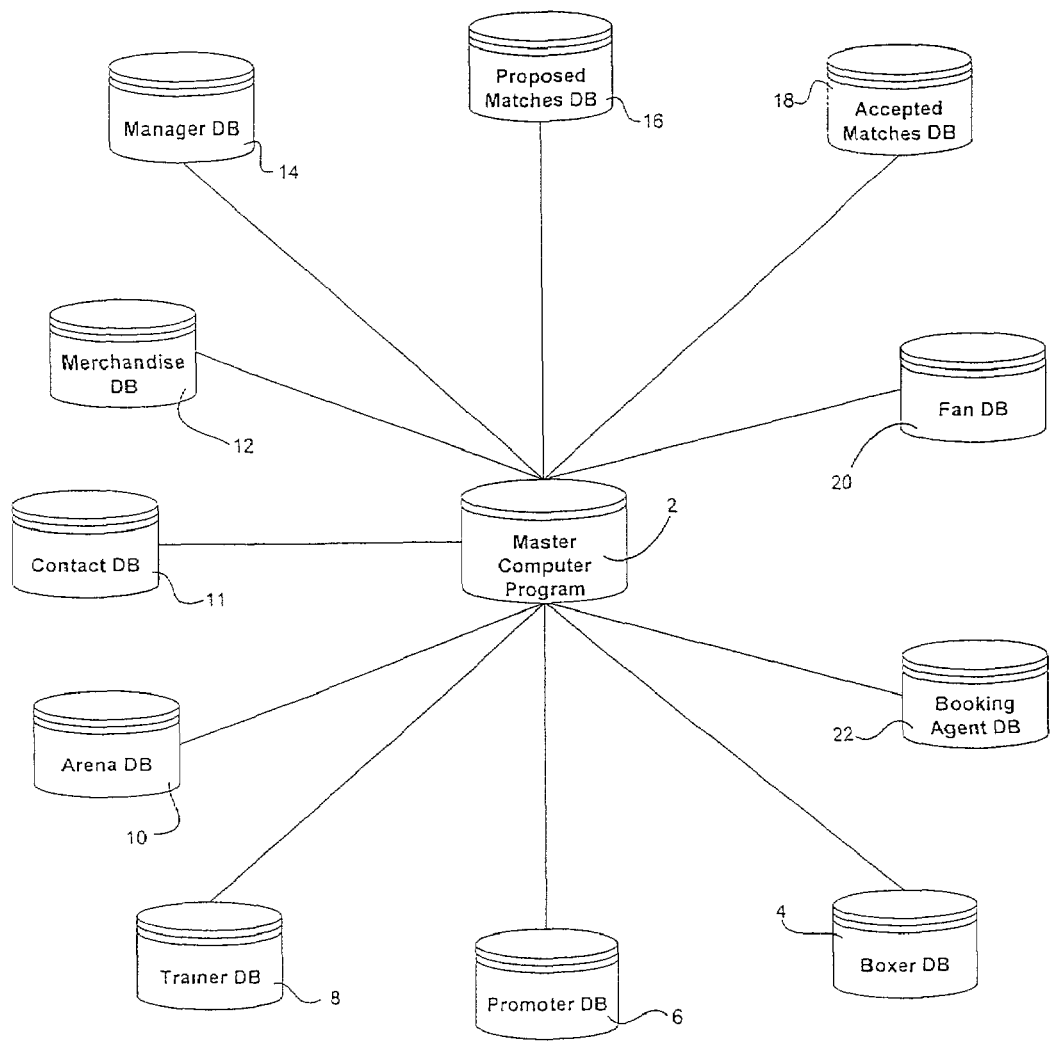
FIG. 2 is a mid-level architectural drawing illustrating the structure and setup of numerous databases within the present invention.

Referring next to FIG. 2, some embodiments of the present invention comprise, a system, computer software program 2 to store large amounts of diverse data and, a method, to efficiently coordinate and arrange this data. Users can query computer software 2 to return information contained within the software 2 in any type of organized and useful manner. The systems, methods and apparatus of embodiments of the present invention comprise databases which store various information used by these embodiments. These databases may be stored as a single database file with information organized for selective access or may be stored as a combination of files which are completely distinct or organized in some type of file hierarchy. Some database files may be stored on a network server 24 accessible to all users, other files may be protected by selective and controlled access. The database files may be any type of data repository including, for example, an SQL table or ASCII text file. Some database files may also be stored in a divided format with portions located on one physical storage device while others are located on another storage device. The databases and files of embodiments of the present invention may be combined or arranged in any number of formats that achieve the function of those embodiments. Any storage method which provides the function of embodiments of the present invention is to be considered within the scope of embodiments of the present invention.

In one implementation of the database structure the present invention incorporates a boxer database 4. Boxer database 4 is a data repository of information about every boxer within the system. Information stored within boxer database 4 could include biographical information about the boxer such as: (1) hometown including city, state, and country; (2) boxer photos; (3) height and weight. Boxer database 4 will also provide details about his boxing record such as: (1) number of fights; (2) total number of losses; (3) losses by KO, TKO, decision, or disqualification; (4) wins; (5) wins by KO, TKO, decision, or disqualification; (6) draws; (7) or by win-loss ratios by decision, KO, or TKO; (8) ranking with his weight class; (9) whether they are a four, six, eight, ten, or twelve round fighter. Boxer database 4 will store information necessary to view the boxer's personal Web page on remote computer 36 with Web browser 38. Data within boxer database 4 enables the boxer or boxing fan, with a click of his mouse, to arrange all of the boxers and their records in any location in any weight class in any manner in which he wants to view it. Boxer database 4 also stores information relevant to allowing a boxer to log-in via a secure connection and gain admittance to other databases that have controlled access. Furthermore, boxer database 4 comprises data that can only be access from a user with specific rights to do so, such as a promoter or manager. One example of sensitive data, with limited user access, could be a boxer's home telephone number. While it is important that a manger or promoter have access to this type of information, it is not desired that the general public be allowed to view such information.

The detailed personal boxer page will also include hyperlinks giving users access to other Web pages controlled an managed by different databases in the system. For example, a hyperlink on the boxer page will route the user to a different Web page that is controlled by a merchandise database 12. Merchandise database 12 will store information specific to allowing users to purchase good and service such as, but not limited to, memorabilia, sporting equipment, paintings, boxing tickets, athletic equipment, books, nutrition products, streaming "real time" fight footage, and video of past fights. In one embodiment, merchandise database 12 is accessed by Web browser 38 on remote computer 36 via a secure connection. Accessing merchandise database 12 via a secure connection allows a user to purchase various goods and service with a credit card and send personal information without the threat of interception by a third party. Furthermore, merchandise database 12 comprises data that can only be accessed from a user with specific rights to do so. Because sensitive credit card information could be stored within the database, limiting access to certain data becomes critically important.

Once a user makes an electronic purchase from merchandise database 12 the order is processed by computer program 2. The managing entity of Web site 25 is notified of the order. The managing entity can fill and ship the order in any manner preferred to the business. Embodiments of the invention include the ability of computer program 2 to track the order and assure the order is filled and shipped in a timely manner.

Systems of embodiments of the present invention also comprise a promoter database 6. Promoter database 6 stores all of the information specific to promoters. Such information will be accessible through use of Web browser 38 on remote computer 36. Examples of the information that will be contained in promoters database 6 are similar to boxer database 4. In this implementation promoter database 6 will contain, but is not limited to, facts about individual promoters, biographical information, contact information, business information, past performance, and the average purse amount the promoter obtains for boxers. Promoter database 6 also stores information relevant to allowing a promoter to log-in via a secure connection and gain admittance to other databases that have controlled access and contains security rules for controlling access to some information contained within the database.

In an additional embodiment of the invention a trainer database 8 is used. Trainer database 8 is utilized to store information unique to boxing trainers. As part of the present invention, a boxer may wish to acquire a trainer to assist in them in conditioning and acquiring boxing skills. Trainer database 8 comprises the specific location in the system where a boxer can find such information. Trainer database 8 can hold, but is not limited to, biographical data such as age, years of experience, location, address, telephone, e-mail address, and photographs. Moreover, trainer database 8 contains statistical data such as past fighters trained, current boxers in training, successfulness of past fighters, style of boxing taught, conditioning routines, types of workout facilities, and video clips that can be viewed through the use of "streaming video" or downloadable video. Trainer database 8 also stores log-in information of trainers useful in controlling their access to certain areas of specific database information and contains security rules restricting access to users without rights to view some information.

As further illustrated in FIG. 2 the structure of the present invention contains an arena database 10. Arena database 10 stores information relevant to boxing arenas throughout the world. As part of boxing promoter's and manager's jobs, they are required to find an arena or facility where the boxing match can take place. Therefore, arena database 10 produces a location for the storage of information on boxing arenas. Without limitation, examples of data that can be stored in arena database 10 are calendar of scheduled events, arena seating capacity, size, location, contact information, list of previous boxing events held, price range of tickets sold, and photographs of the arena. As with the other databases previously described, certain information within the database will have controlled access. Other aspects relating to arena database 10 will become known through use of the invention.

Figure 9:
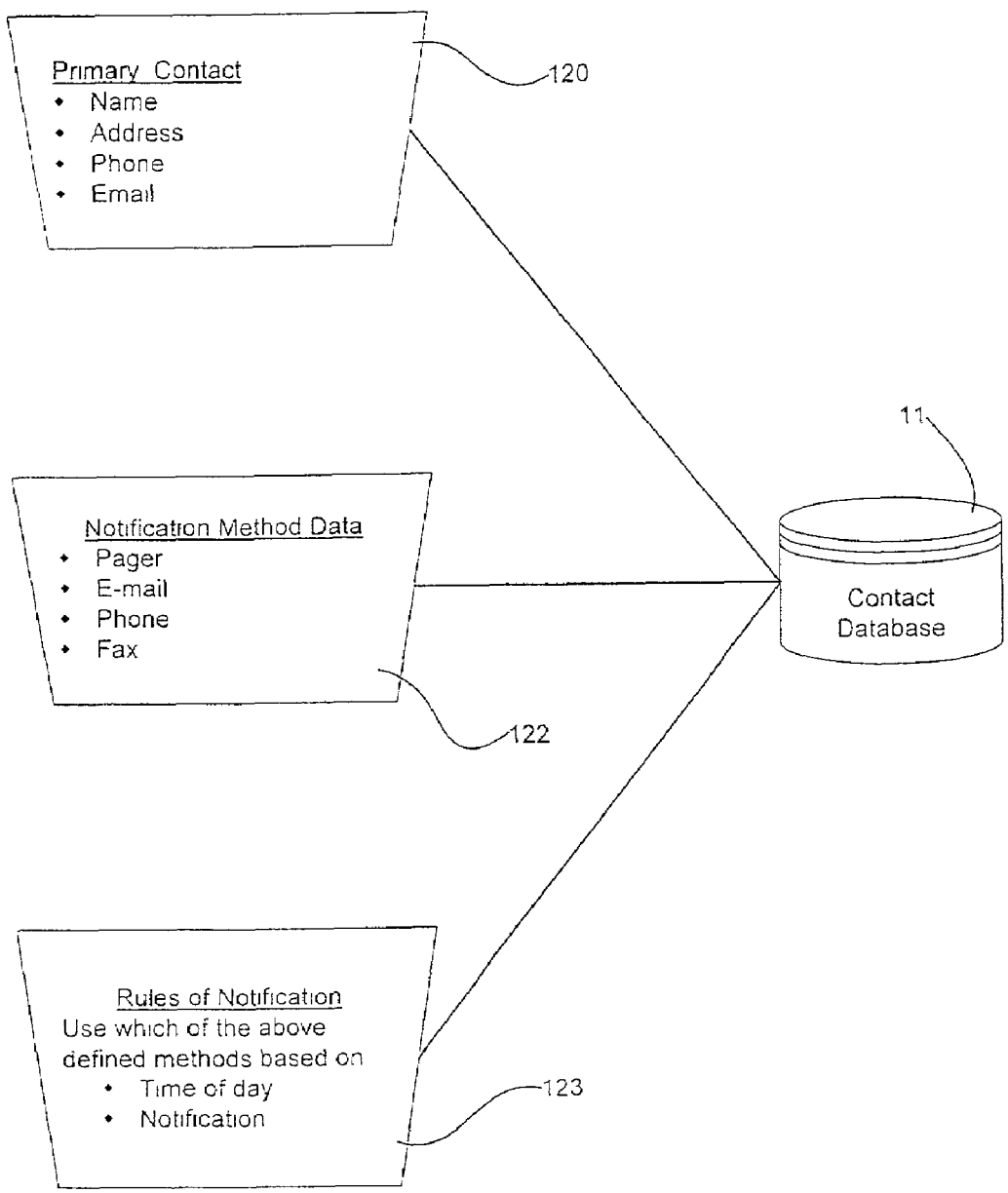
FIG. 9 is a diagram illustrating details of contact data.

FIG. 2 also shows an embodiment for a contact database 11. Contact database 11 stores information that will be used by the present invention in various notification procedures. FIG. 9 shows in greater detail the functionality of contact database 11. Contact database 11 will hold information about boxers, managers, trainers, arenas, promoters and any other individuals which use the system. Users are referred to as the primary contact 120. Information stored in contact database 11 about primary contacts 120 could consist of name, address, e-mail address, phone numbers, fax number and pager numbers. Primary contacts 120 are given the ability to set a preferred notification method 122. Notification method 122 for primary contact 120 is stored in contact database 11. Notification method 122 could consist of pager, e-mail, phone or cell phone, and fax machine. Contact database 11 also stores the rules for notification 124 of primary contacts 120. Rules of notification 124 could encompass a specified time of day in which the user is to be notified. Additionally, for example, rules of notification 120 could specify that a user is to be notified by e-mail before 12:00 pm and by pager after 12:00 pm.

Referring again to FIG. 2, selected embodiments of the present invention also comprise a manager database 14. Manager database 14 is very similar in structure to trainer database 8 and promoter database 6 as previously described. Manager database 14 is designed to hold information necessary assist a boxer in finding a manager. Manager database 14 can hold, but is not limited to, biographical data such as age, years of experience, location, address, telephone, e-mail address, and photographs. Moreover, statistical data such as past fighters managed, current boxers they are managing, successfulness of past fighters, connections to industry professionals, and video clips which can be held in manager database 14. As with other databases, manager database 14 stores log-in information of managers useful in controlling their access to certain areas of specific database information. Manager database 14 also contains similar security rules to the other databases already described, restricting access to information stored within.

In other embodiments of the present invention boxers are capable of challenging or accepting a challenge of another boxer to a fight. Therefore, it becomes necessary to store the boxer's challenges somewhere within the system. Consistent with the previously described structure, the present invention incorporates a proposed match database 16. Proposed match database 16 stores any information relating to a boxing match which has be proposed by one boxer, but not yet accepted by the second boxer. Other information which could be stored in proposed match database 16 are the conditions which the challenging boxer has placed upon the match. For example, he may wish to fight a particular boxer, but only if the winning purse is a certain amount of money. He may wish to fight a boxer who falls within a certain weight class or who will fight on a certain date. The present invention provides a method where the boxer can require conditions to be met before he is willing to fight. All of this data is stored in proposed match database 16. Data stored within proposed match database 16 will have controlled access. For example, only boxers, managers, and promoter will have access to view and manipulate the data. Proposed match database, like all other databases in the system, security rules are incorporated to control access. It is possible that the system can be modified to allow any desired user to view and change the data within proposed match database 16. These circumstances are controlled by the manager of Web site 25 and can be evaluated and changed as desired and can be further explored through use of the invention.

A further embodiment of the present invention is an accepted match database 18. Accepted match database 18 is very similar in function and structure to proposed match database 16. Once a boxer has accepted a challenge from another boxer, and the specific terms are agreed upon, data is transferred from proposed match database 16 to accepted match database 18. Although the data contained in the database is similar, it is used for different purposes. Data stored in accepted match database 18 is most useful to promoters. Promoters will find data in accepted match database 18 extremely helpful to find pre-made boxing matches. The invention gives promoters the ability to efficiently search data in accepted matches database 18 and find boxing matches that they want to promote. Therefore, accepted match database 18 has the ability to store all of the information which was once contained in proposed match database 16, but can be used for different purposes. Accepted match database 18 has the same security rules as proposed match database 16 and allows only limited access.

Figure 3:
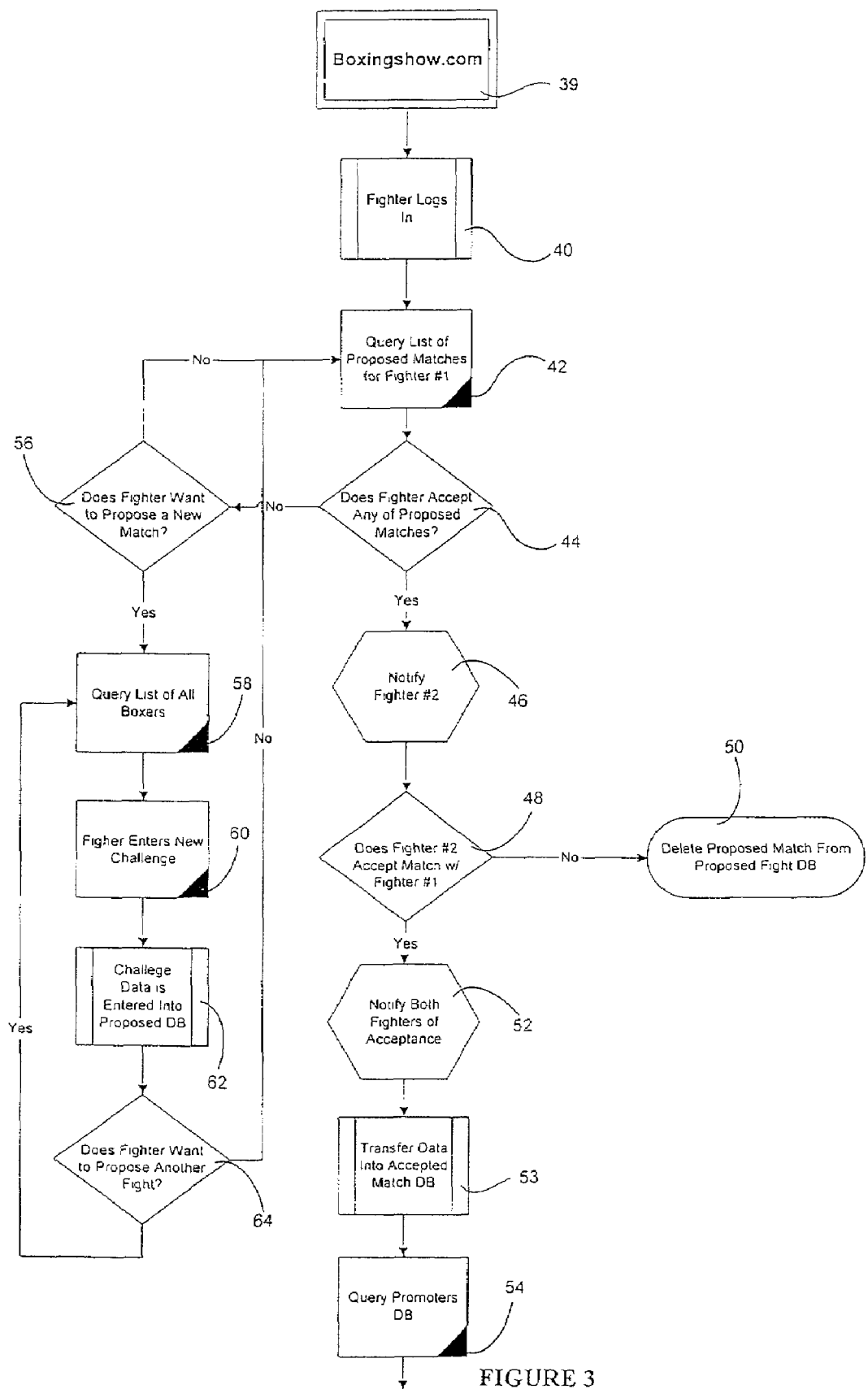
FIG. 3 is a flow diagram illustrating a transaction sequence in accordance with an embodiment of the present invention.
Figure 4:
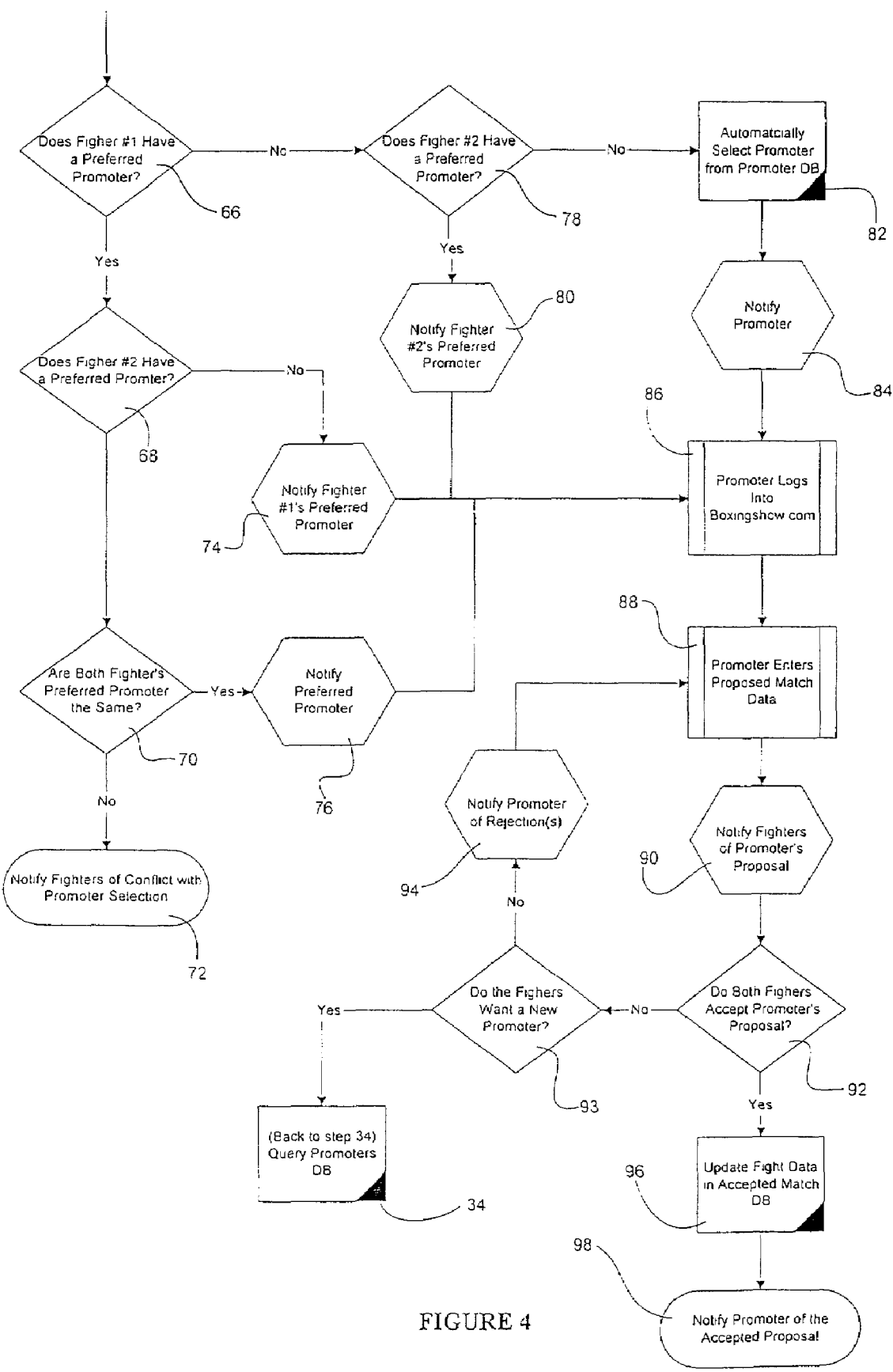
FIG. 4 is a continuation of the flow diagram in FIG. 3 illustrating a transaction sequence in accordance with an embodiment of the present invention.

Referring next to FIG. 3 and FIG. 4, showing the process of only one of the many embodiments of the present invention. In this embodiment, the invention is best demonstrated by showing the process of a boxer as a remote user. In the first example, the boxer will be given the most control over conditions in which he will agree to a boxing match. The boxer is given two opportunities to accept or reject a match. He can accept or reject the terms set out between boxers and he can accept or reject the terms set out by the promoter.

First, a boxer accesses Boxingshow.com 39 with remote computer 36 running compatible Web browser 38. Boxingshow.com 39 displays its "home page" on Web browser 38. As an embodiment of the invention the user interface to access and use computer program 2 are Web pages sent in HTML 26 to Web browser 38 from Web server 28. A Web page consists of hyperlinks which direct the user to different parts of the system by requesting further HTML 26 documents from Web server 28. On the "home page" the boxer will click on a hyperlink which will allow him the ability to log-in 40 to master computer program 2. Upon completion of log-in 40 computer program 2 queries a list of proposed fights 42 from proposed match database 16. The boxer is given the option to accept any of the challenges issued by other boxers 44. If the boxer does not accept any of the proposed matches, he is asked if he would like to propose a new boxing match with another boxer 56.

If the boxer would like to challenge another boxer, computer program 2 queries 58 a list of boxers from boxer database 4. Query 58 provides the boxer data about other boxers so he can quickly make comparisons of the records of all the boxers in his weight class with his experience. Any numerous conditions can be placed upon query 58 therefore, yielding different data sorted in different ways depending upon boxer preference. Because the present invention provides an interactive user interface through use of Web site 25 and Web browser 38 a boxer can click hyperlinks pointing to the boxer's personal Web pages so he can further review information about the boxer he is considering fighting.

The boxer then enters the challenge 60, with any conditions and limitations placed upon the challenge, into Web browser 38. The conditions and limitations a boxer could place upon a fight might be the desired purse amount or the date on which the fight can take place. The information is transferred as previously described from the explanation of FIG. 1. Computer software 2 stores the new challenge 62 into proposed match database 16. The boxer is given the option to make another challenge 64. If he decides to make another challenge 64 he is returned to step 56. If the boxer chooses not to propose another boxing match 64 he is returned to main menu 42.

When the boxer encounters a decision to accept a proposed fight 44 and chooses to accept 44, computer program 2 will notify 46 the other fighter that the match has been accepted. Notification 46 of the other boxer can occur many different ways. A preferred method for notification 46 is for computer software 2 to automatically send an e-mail to the boxer. Another method for notification 46 can occur via an automated telephone message to a cell phone. Other notification 46 could include voice messaging, facsimile, or telephone call to a standard telephone. Once the challenging boxer is notified 46 he must decide if he is willing to agree to the match he proposed 48. If he declines, the proposed match is deleted 50 from proposed fight database 16. If the fighter agrees to the fight the information is transferred 53 from proposed match database 16 to accepted match database 18. Both fighters are notified of acceptance 52.

Once both boxers have agreed to a boxing match computer program 2 will query 54 promoters database 6. The query will return to the boxers a list of possible promoters. Fighter #1 will be required to specify if he has a preferred promoter 66. If he does not have a preferred promoter computer program will check to see if fighter #2 has a preferred promoter 78. If fighter #2 has a preferred promoter 78 the invention will then notify 80 fighter #2's preferred promoter. Notification 80 can occur in the same manner as notification 46 of a boxer previously discussed. The system will then move to step 86 which will be discussed below.

Furthermore, if fighter #1 does not have a preferred promoter 66 and fighter #2 does not have a preferred promoter 78, the system will proceed to automatically select a promoter 82 from promoter database 6. Different criteria can be built into the system as to aid and control automatic promoter selection 82 process. Upon selection 82 the invention proceeds to notify 84 the selected promoter. Notification 84 can occur in the same manner as notification 46 of a boxer previously discussed. Computer program 2 proceeds to step 86 which will be discussed below.

In the event that fighter #1 does have a preferred promoter 66, the invention will check to see if fighter #2 has a preferred promoter 68. If fighter #2 does not have a preferred promoter 68 the system will automatically select fighter #1's preferred promoter and notify 74 that promoter. Notification 74 can occur in the same manner as notification 46 of a boxer previously discussed.

Should both fighter #1 and fighter #2 have a preferred promoter the system will compare 70 each of the preferred promoters and check to see if they are the same. If both fighters want to use the same promoter the system will notify 76 the selected promoter. Notification 76 can occur in the same manner as notification 46 of a boxer previously discussed. If the system compares 70 the fighter's preferred promoters and they are different a notification 72 process will occur to alert both fighters of a conflict with promoter selection. The fighters may then choose to begin the process again or may choose not to fight at all anymore.

Next, the chosen promoter logs-in 86 to Boxingshow.com 39 through the use of remote computer 36 running compatible Web browser 38. Data about the boxing match is called from accepted match database 18 and displayed for the promoter. Promoter can then enter 88 proposed data about the boxing match. Such data could be, but not limited to, the date of the fight, the purse amount, and the location of the fight. The boxers are notified 90 of the specifics of promoter's proposal. Notification 90 can occur in the same manner as notification 46, as previously discussed. The system will then compare 92 responses from both fighters to see if both agree to the promoter's proposal. If both fighters do not agree the system will find out 93 if the boxers would like to choose a new promoter. If the fighters only reject the proposal 92, but don't reject the promoter 93 the system will notify 94 promoter of the rejected proposal. If the fighters reject the proposal 92, and reject the promoter 93 the system will notify 94 of both rejections. The system returns the boxers to step 54.

Figure 5:
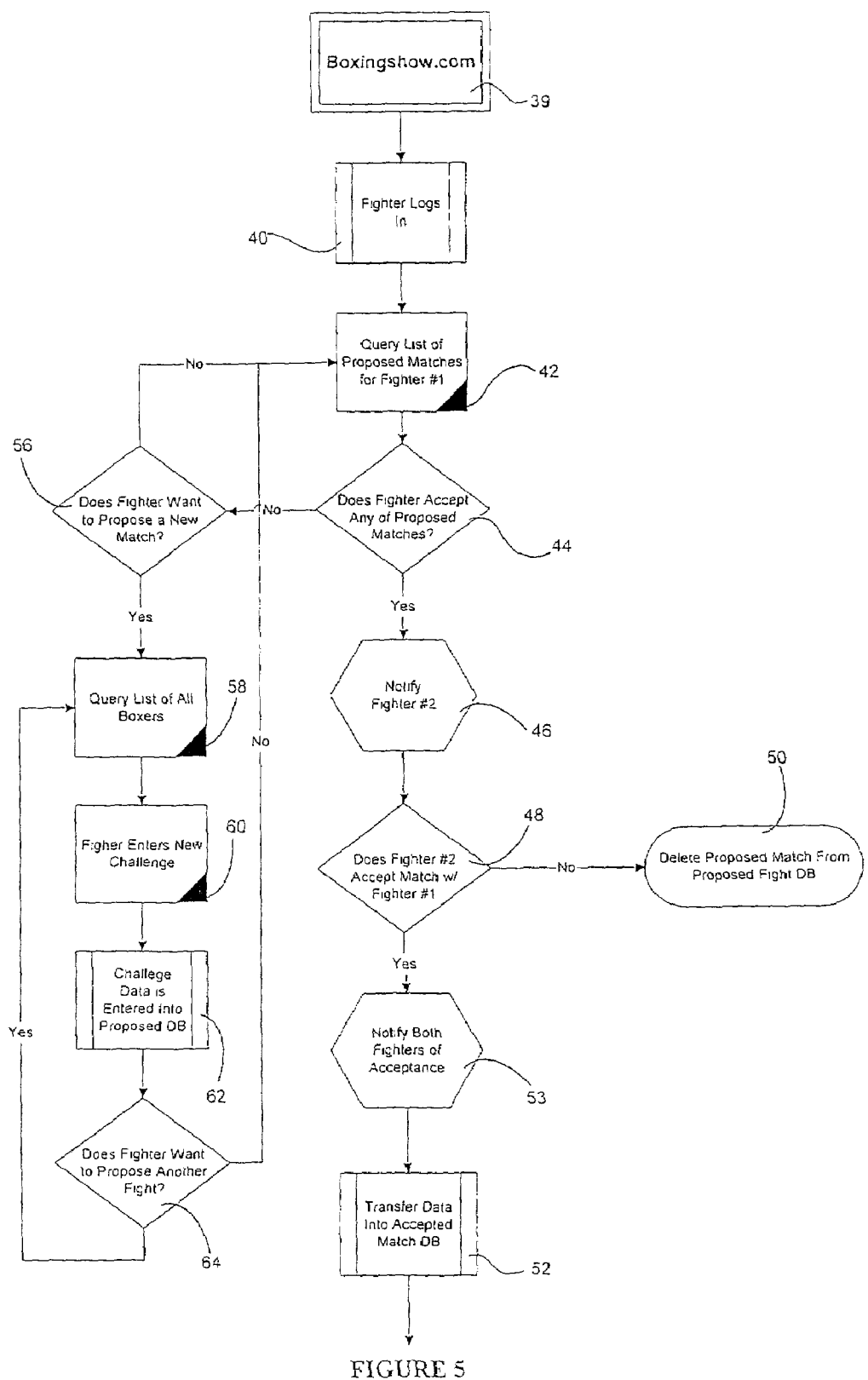
FIG. 5 is a flow diagram illustrating a transaction sequence in accordance with another embodiment of the present invention.
Figure 6:
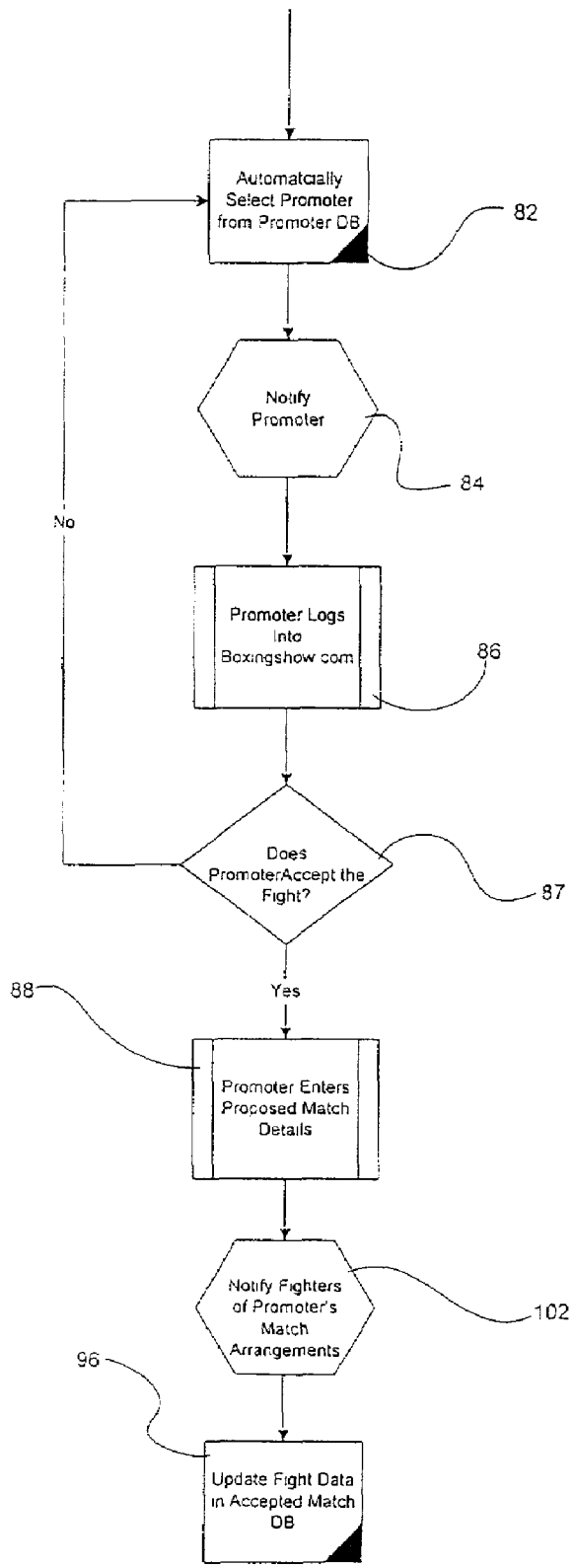
FIG. 6 is a continuation of the flow diagram in FIG. 5 illustrating a transaction sequence in accordance with another embodiment of the present invention.

FIG. 5 and FIG. 6 are another method which could be used to coordinate boxing matches. This second method, like the method previously explained, is only one example of the numerous way the invention can function. Any method which provides the function of embodiments of the present invention is to be considered within the scope of embodiments of the present invention. The second example gives a boxer some control over fight conditions, but not as much control as the first method. In this example the boxer can still set conditions placed upon the fight, but he has control over the selection of a promoter and the options provided by the promoter.

The method and function of the second example, FIGS. 5 and 6, is identical to the function described in FIGS. 3 and 4, until step 53 is reached. Once the boxer is notified 53, the process of selecting a fight ends for the boxer. Next computer program 2 automatically selects 82 a promoter from promoter database 6. Promoter is then notified 84 of his selection by computer program 2. Once the promoter is notified 84 the promoter logs-in 86 to Boxingshow.com 39 through use of remote computer 36 running compatible Web browser 38. Data about the boxing match is called from accepted match database 18 and displayed for the promoter. Similar to the boxers, the promoter has access to view various information about the boxers and determine if the fight is made up of two boxers he would like to promote. Through use of Web browser 38 the promoter gain view, sort, and explore endless amounts of data. The chosen promoter is then given the option to accept or reject 87 the opportunity to promote the fight. If the promoter chooses not to accept 87 the system returns to step 82 and selects another promoter. If the promoter accepts 87 he can then enter 88 proposed fight data about the boxing match. Such data could be, but not limited to, the date of the fight, the purse amount, and the location of the fight. Once the promoter enters 88 the fight details notification 102 is sent to both fighters. Also, once the promoter enters 88 the fight details the data within accepted match database 18 is updated.

Figure 7:
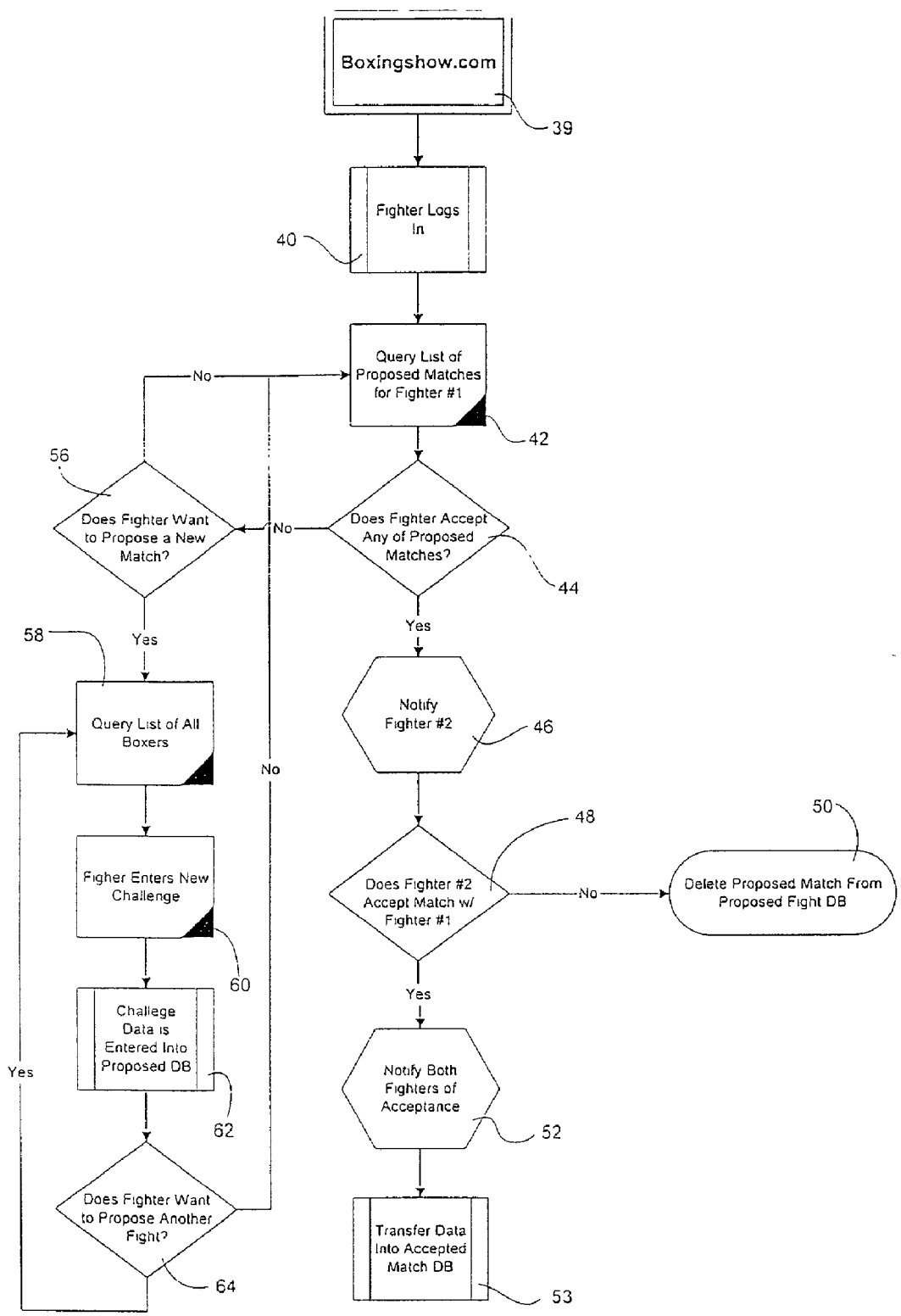
FIG. 7 is a flow diagram illustrating a transaction sequence in accordance with a further embodiment of the present invention.
Figure 8:
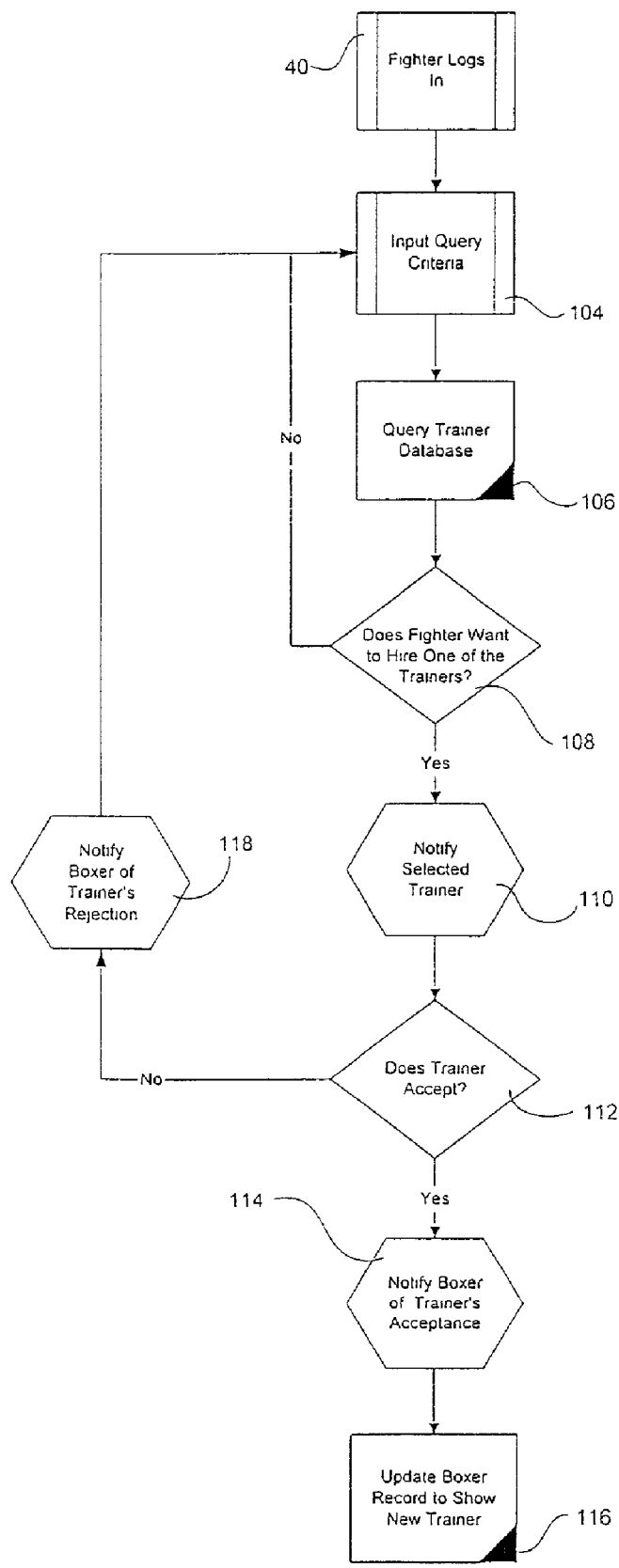
FIG. 8 is a flow diagram illustrating a transaction sequence in accordance with an embodiment of the present invention.

FIG. 7 shows another example of how the functionality of computer program 2 could operate. The two previously described methods give boxers more control than the method shown in FIG. 7. The method shown in FIG. 7 gives promoters more flexibility and more options than do previous methods.

The flow diagram depicted in FIG. 7 illustrates the method of a boxer using the invention to challenge or accept a challenge from another boxer. The logical flow is the same as described in FIG. 3, with one significant difference. Once a fighter accepts 48 a challenge and both fighters are notified 52 the fight data is transferred 53 into accepted match database 18, the boxer's role in the process in finished. This third example of how the system could function, gives other parties much more control in the process. A promoter can log-in to the system at anytime and browse through the numerous fights that are stored in accepted match database 18. The promoter can query data within accepted match database 18 in any order or fashion are search in of a pre-made fight. The promoter can select one of the pre-made fights from his query results and choose to promote that particular fight. After choosing to promote a fight, the promoter will be able to enter the details about the fight such as purse amount and date of the fight.

In the same way that promoters can log-in to the system and query accepted match database 18, sporting arenas and hotel-casino properties will have the same ability. For example, an arena can log-in and query accepted match database 18 looking for a pre-made fight that they would like to host in their sporting arena. The arena will be able to search through accepted match database 18 in any manner of their choosing, in order to yield results necessary to fulfill their purposes. If the arena finds a match which they would like to host, they can flag the fight record in accepted match database 18 and enter data indicating how much they are willing to pay to gain the rights to host the fight. This information could be of great importance to a promoter. If a promoter finds an arranged match with an arena or hotel-casino putting up money for the fight, he could be more willing to promote the fight. This also reduces the amount of effort required to promote the boxing match.

Likewise, if promoters and arenas are able to log-in and view the data stored in accepted match database 18, television producers could be given the ability to log-in and view the data. Television producers need to query and sort boxing match data similar to arenas and hotel-casino properties. Television producers may desire to televise a certain boxing match and can therefore modify the fight record within accepted match database 18 to show their interest in televising the match. The TV producers are given the ability to enter the amount of money they are willing to pay to the boxers, promoters, and managers in order to secure the rights to televise the match. Television producers ability to search through pre-made fight data helps them to find the most exciting fights for their audience. For example, a television producer could search for fights between two fighters from the local broadcast area. Selecting such a fight could generate greater viewing interest and help to secure better ratings for the television station.

Furthermore, conditions may exist were two or more competing broadcaster producers desire to broadcast or televise the match. It is within embodiments of the invention to allow any and all interested parties to bid on rights to televise the match. The invention will store all of the bids made by the producers in a designated database. The television producer who agrees to pay the most money will be allowed to televise the match. Similar embodiments include allowing arenas and hotel-casinos to engage in a bid process. Meaning, that one or more competing interests will enter their proposals into a designated database, and the one willing to pay the most money wins the bid, allowing them to host the fight at their arena or hotel-casino.

In an additional embodiment of the present invention a boxer can use the invention to find a trainer, strength coach, conditioning coaches and nutritionists. For example, but not by way of limitation, a trainer will be used to illustrate the embodiment. The boxer can log-in 40 to Boxingshow.com 39. Once the boxer has logged-in 40 he is give the option to input 104 criteria to search for a trainer. The boxer may desire to find a trainer in the same city or state as he is located. Thus, the boxer could input 104 search criteria for a trainer in the same city or state. Input 104 criteria is sent to Web site 25. Computer software 2 queries 106 trainer database 8 and returns the results to the boxer at remote computer 36. The boxer can then browse the results of query 106. Browsing of returned query 106 could consist of clicking on hyperlinks to allow the boxer to view different personal Web pages of the trainers. By viewing the different personal Web pages of the trainer a boxer find a trainer who will best fit the boxer's individual needs. The boxer is then given the option to hire 108 one of queried 106 trainers. If the boxer chooses not to hire one of queried 106 trainers he is returned to the interface Web page which allows him to input 104 new criteria. If the boxer finds a trainer in query 106 that he would like to hire he can select the trainer and the invention will notify 110 the selected trainer. Notification 110 could be any method of notification previously discussed.

Upon notification 110 the trainer is give the ability to accept or reject 112 the request made by the boxer. If the trainer rejects 112 the boxer's request notification 118 is sent to the boxer alerting him to the trainer's rejection. The boxer can then begin the process of looking for a trainer again by returning to step 104. Should the trainer choose to accept 112 the request, the boxer is notified 114, of the trainer's acceptance. Also, should the trainer choose to accept 112 the request, the invention will update the boxer's record stored in boxer database 4 to show the change made in trainers.

It is a further embodiment of the invention to encompass a means to allow a boxer to select a manager. The previous example has shown a method of selecting a trainer, the method of selecting a manager could follow the same logical flow as demonstrated in the trainer example.

The present invention further provides a method of finding a sparring partner. Similar to the method described in finding a trainer, a boxer can look for a sparring partner. The invention could provide a database to store sparring partners and then this data can be sorted, organized and queried in any desired fashion. Examples of how the information could be by specific weight class, height, right-handed, south paw, time need, and salary. The boxer can then select his preferred sparring partner in a manner that has previously been disclosed. Notification options can also be implemented as also formerly disclosed.

The present invention additionally provides fans and boxers the ability to chat "on-line." Being able to chat on-line provides entertainment value for the fans. Fans could discuss matters recent boxing matches or just discuss the latest boxing gossip. Boxers may want to chat with other boxers and "trash talk" the other boxer trying to provoke the other boxer to accept a boxing match. Boxers may also want to chat with their fans in the said chat rooms.

Embodiments of the present invention may utilize computerized text files, any and all computer programming languages, networking technology, databases, digital photographs and video, and other images and models as well as other records. These systems may link to other programs to perform some functions of the present invention. These systems may also access other databases such as bank accounts and credit accounts to perform their designated functions.

The embodiments offered for example are equally applicable to other sporting events. These events can include, but are not limited to, individual sports and team sports, as well as sport demonstrations or exhibitions. For example, individual sports such as boxing, wrestling, tennis, and the like, that offer direct competition against a competitor can modify the above example with no or little change other than terminology for application. A tennis player would select a competitor outside of a set competition to provide a competitive or exhibition for fans of both players. In wrestling, a wrestler would utilize the system nearly identically as that as a boxer to find worthy and lucrative opponents or helpful trainers or agents.

Non-directly competitive individual sports, such as golf, skiing, and the like can utilize the information to find instructors, agents, offer sports memorabilia or fan access via fanmail, chatting or group rooms. Also, events can be posted locally, regionally, nationally, or internationally, depending on the competitor's location and abilities, to obtain entry into those various events. Also, event sponsors can utilize the web-based system to select desirable or up and coming sports figures to participate in the event, thereby increasing spectator turnout or purse winnings.

For team sports, individuals can locate personal trainers or agents as well as participate in a centralized web location for fan appreciation and mingling. Further still, local events can be sponsored that include local or regional celebrities. Baseball events, basketball events, football events, and any other team event can benefit from the teachings of the present invention in providing more individuals access to greater resources than was otherwise possible. Further still, team exhibitions can be arranged during off season or even on off days during the season that are helpful to charitable causes and local community outreach. This could include youth organizations seeking player availability not easily know through other channels to schedule a visit from a popular team member or members from a popular team. Or to announce when a sports player will be attending an event in a fan's local region. Also, charitable exhibitions can be arranged between professional teams or groups of celebrities that are either entertainers or local personalities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for coordinating a competitive boxing match using an integrated Internet-based system comprising:
   a. receiving boxer information from a plurality of boxers on an Internet-based system;
   b. organizing the received boxer information into an electronically-searchable format on the Internet-based system based on categories of characteristics relevant to organizing boxing matches between said boxers;
   c. providing selective access on the Internet-based system to the electronically-searchable format to at least the plurality of boxers, promoters of boxing matches, venues for hosting boxing matches, and boxing fans;
   d. providing a proposed match database on the Internet-based system;
   e. receiving an electronic challenge using the Internet-based system from a first boxer selected from the plurality of boxers to fight a second boxer selected from the plurality of boxers, the challenge creating a proposed match in the proposed match database;
   f. transmitting the challenge to the second boxer using the Internet-based system;
   g. receiving an acceptance of the challenge from the second boxer using the Internet-based system, the acceptance changing the proposed match into an accepted match on an accepted match database on the Internet-based system;
   h. providing information about the accepted match to a promoter using the Internet-based system;
   i. said first boxer and second boxer receiving a proposal for promoting the accepted match from the promoter using the Internet-based system;
   j. providing information about the accepted match to a venue capable of hosting the accepted match using the Internet-based system; and
   k. receiving a proposal for hosting the accepted match from the venue using the Internet-based and
   i. wherein the venue agrees to host said accepted match and said accepted match occurs.

2. The method of claim 1 wherein the boxer information comprises information selected from the group of hometown, boxer photographs, height, weight, number of fights, total number of losses, number of losses by KO, number of losses by TKO, number of losses by decision, number of losses by disqualification, total number of wins, number of wins by KO, number of wins by TKO, number of wins by decision, number of wins by disqualification, number of draws, wins-loss ratio by decision, wins-loss ratio by KO, wins-loss ratio by TKO, ranking within the boxer's weight class, and number of rounds the boxer fights.

3. The method of claim 1 wherein the challenge includes limitations on the challenge that must be accepted by the second boxer as part of the acceptance, the limitations selected from the group of the desired purse amount, the number of rounds, the date of the match, and the geographical location of the match.

4. The method of claim 1 further comprising:
receiving a second electronic challenge using the Internet-based system from the first boxer to fight a third boxer selected from the plurality of boxers, the challenge creating a second proposed match in the proposed match database;
transmitting the second challenge to the third boxer using the Internet-based system;
receiving a rejection of the second challenge from the third boxer using the Internet-based system, the rejection deleting the second proposed match from the proposed match database.

5. The method of claim 1 further comprising:
transmitting the proposal for promoting the accepted match to the first and second boxers using the Internet-based system;
receiving responses from the first and second boxers using the Internet-based system, the responses selected from the group of:
acceptances from both the first and second boxers, wherein the acceptances cause information in the accepted match database to be updated to reflect the proposal for promoting;
rejections from both the first and second boxers, wherein the information in the accepted match database is not updated, and wherein the information about the accepted match may be transferred to another promoter; and
an acceptance from one of the first and the second boxer and a rejection from the other of the first and the second boxer, wherein the information in the accepted match database is not updated, and wherein the information about the accepted match may be transferred to another promoter; and transmitting the received responses to the promoter that provided the proposal for promoting the accepted match using the Internet-based system.

6. The method of claim 1 further comprising:
receiving additional proposals for promoting the accepted match from additional promoters using the Internet-based system;
transmitting the proposal for promoting the accepted match and the additional proposals for promoting the accepted match to the first and second boxers using the Internet-based system; and
receiving a selection of a proposal selected from the proposal for promoting the accepted match and the additional proposals for promoting the accepted match from the first and second boxers using the Internet-based system.

7. The method of claim 1 further comprising:
receiving additional proposals for hosting the accepted match from additional venues using the Internet-based system;
transmitting the proposal for hosting the accepted match and the additional proposals for hosting the accepted match to the promoter using the Internet-based system;
receiving a selection of a proposal selected from the proposal for hosting the accepted match and the additional proposals for hosting the accepted match from the promoter using the Internet-based system; and
incorporating the selected proposal for hosting the accepted match into the promoter's proposal for promoting the accepted match.

8. The method of claim 1 wherein the Internet-based system comprises means selected from the group of:
means for selling merchandise related to boxing and to boxers selected from the plurality of boxers;
means for searching and browsing among available agents and for communicating between boxers and those agents to permit the boxers to solicit representation by an agent selected from the available agents;
means for searching and browsing among available trainers and for communicating between boxers and those trainers to permit the boxers to solicit training from a trainer selected from the available trainers; and
means for searching and browsing among available managers and for communicating between boxers and those managers to permit the boxers to solicit a managerial relationship with a manager selected from the available managers.

* * * * *